US012771679B2

(12) United States Patent
Yang

(10) Patent No.: US 12,771,679 B2
(45) Date of Patent: Oct. 20, 2026

(54) SECURE AUTHORIZATION METHOD AND SYSTEM

(71) Applicant: Telefónica Innovación Digital, S.L.U., Madrid (ES)

(72) Inventor: Xiaoyuan Yang, Madrid (ES)

(73) Assignee: Telefónica Innovación Digital, S.L.U., Madrid (ES)

(*) Notice: Subject to any disclaimer, the term of this patent is extended or adjusted under 35 U.S.C. 154(b) by 41 days.

(21) Appl. No.: 18/934,505

(22) Filed: Nov. 1, 2024

(65) Prior Publication Data

US 2025/0150443 A1 May 8, 2025

(30) Foreign Application Priority Data

Nov. 3, 2023 (EP) .................................... 23383118

(51) Int. Cl.
*H04L 9/40* (2022.01)
*G06F 21/45* (2013.01)

(52) U.S. Cl.
CPC .............. *H04L 63/08* (2013.01); *G06F 21/45* (2013.01); *G06F 2221/2111* (2013.01); *H04L 2463/082* (2013.01)

(58) Field of Classification Search
CPC ... H04L 63/08; H04L 2463/082; G06F 21/45; G06F 2221/2111
See application file for complete search history.

(56) References Cited

U.S. PATENT DOCUMENTS 10,164,973 B1 * 12/2018 Prasad .................... H04W 4/80
10,200,359 B1 * 2/2019 Sokolov .............. H04W 12/068
10,325,259 B1 6/2019 Shahidzadeh et al.
11,080,385 B1 * 8/2021 Angara ............... H04W 12/068

FOREIGN PATENT DOCUMENTS

EP 3336735 A1 6/2018

OTHER PUBLICATIONS

European Search Report for EP 23 38 3118.9 dated Apr. 16, 2024.

* cited by examiner

*Primary Examiner* — Ellen Tran
(74) *Attorney, Agent, or Firm* — Sughrue Mion, PLLC

(57) ABSTRACT

A secure authorization method and system. The method includes providing, an XFA authorization backend having registered therein a user that wants to protect access or protect the performance of an operation on an Internet-connected asset having a service backend computer where the asset is assigned to the user through an identifying element; receiving, by the XFA backend, one or more user-configurable security factors that are linked to a producer service and provide information about the user. When the user wants to access the asset or the performance of an operation on the asset, the XFA backend receives a checking enquire for at least one of the user-configurable security factors, and in response to the checking enquire, the XFA backend checks if the user fulfils the enquired user-configurable security factor/s using the identifying element, and authorizes or denies the access or the performance of the operation based on the checking.

14 Claims, 6 Drawing Sheets

SECURE AUTHORIZATION METHOD AND SYSTEM

TECHNICAL FIELD

The present invention relates to a method and system for secure authorization that provide extra factor authentication (XFA).

BACKGROUND OF THE INVENTION

In today's digital era, online services have become an indispensable part of our daily lives. Whether it's accessing email, social media, or managing financial transactions, the need for reliable and secure authentication and authorization mechanisms is paramount.

This is where various methods come into play, ensuring that users can access these services with confidence. While the traditional username and password combination remains the simplest and most widely used authentication method, there are more advanced protocols available to enhance security and convenience.

One such protocol is OAuth, which has gained significant popularity in recent years. OAuth allows users to grant limited access to their online resources, such as granting permission for a third-party application to access their social media accounts without divulging their actual credentials. This delegation of authority helps ensure the privacy and security of users' sensitive information while enabling seamless integration between different applications and platforms.

Another widely adopted protocol is OpenID Connect, which builds upon OAuth's capabilities and focuses on identity verification. It allows users to authenticate themselves to multiple services using a single set of credentials, eliminating the need for separate usernames and passwords for each application. OpenID Connect enables a streamlined and standardized process for authentication and user identity management, enhancing both security and user experience.

In the realm of online security, second-factor authorization has emerged as a highly popular and effective method to fortify the protection of our digital identities. As our reliance on online services grows, traditional username and password combinations have proven susceptible to breaches and vulnerabilities. Second-factor authorization, also known as two-factor authentication (2FA) or multi-factor authentication (MFA), provides an additional layer of security by requiring users to provide a second form of authentication beyond their passwords.

There are various methods of implementing second-factor authorization, including SMS-based codes, authenticator apps, hardware tokens, and biometric authentication. Each method offers its own advantages and considerations, allowing users to choose the most convenient and secure option for their specific needs.

Leading services like Google, Facebook, and Microsoft's Office360 employ 2FA on a daily basis to safeguard user identities. Various implementations of 2FA exist. Some of these implementations necessitate the download of an application, such as Telefonica's Latch [1] solution. Others rely on dedicated hardware for 2FA, like Yubico [2], Google's Titan [3], or Kensington's VeriMark [4]. However, the most popular approach involves the use of a telephone number as the second factor of authentication. In this method, when a service requires 2FA, it dispatches a random number to the user's phone as an SMS. The end-users are then prompted to enter the received number on the login page.

[1] provides users with the ability to modify a "latch" status in the backend, and various services can request the state of the "latch" to determine authorization. This means that the authorization process does not require any input from users. However, similar to other systems, the Latch system only relies on a single input from the user and lacks scalability in terms of implementing multiple factors for a more secure system.

In U.S. Pat. No. 11,159,517B2, the authors propose a federation system designed to aggregate multiple authorization systems. This approach enables the integration of various authorization mechanisms, thereby enhancing the overall security and flexibility of the system. However, it is worth noting that the proposed solution may not be well-suited for IoT headless systems since it assumes the presence of authorization systems that require user input. For IoT headless systems, alternative approaches that accommodate the lack of direct user interaction would need to be considered.

In IoT space, solutions such as U.S. Pat. No. 9,589,397B1 do also exist where shared keys are used to ensure authorization.

A crucial requirement for most current 2FA systems is that users need to be online and able to provide the second factor when accessing a service. While 2FA adds an extra layer of security to online accounts, it does introduce the need to ask user to perform some task (for instance, introducing a PIN received from SMS o from a physical security key, etc.).

Another requirement for 2FA is the need for a front-end (a head) where users can enter their second factor, such as a PIN, this can pose challenges for certain services, especially those on the IoT domain. For example, certain IoT devices requires an extra application for settings and to perform 2FA.

Many existing XFA systems have a fixed number of factors and lack the ability to dynamically aggregate additional factors. This limitation significantly reduces the level of protection offered. Present invention addresses this issue by enabling all services to participate in the authorization process. By involving a greater number of services, the overall security of the XFA authorization system is enhanced.

The scalability of factors in XFA authorization system design is of utmost importance for IoT headless systems where direct user interaction is absent. In such scenarios, the XFA system must rely on multiple factors associated with users to accurately determine authorization.

REFERENCES

[1] https://latch.elevenpaths.com/

[2] https://www.yubico.com/

[3] https://store.google.com/us/product/titan_security_key?hl=en-US&pli=1

[4] https://www.kensington.com/es-es/p/productos/protecci%C3%B3n-de-datos/biom%C3%A9tricos/la-llave-de-la-huella-digital-verimark-de-kensington-es-compatible-con-windows-hello-y-u2f-de-fid/

DESCRIPTION OF THE INVENTION

The present invention proposes, according to one aspect, a secure authorization method, comprising providing, an extra factor authentication, XFA, authorization backend, the latter having registered therein a user that wants to protect access to an Internet-connected asset (for example, a smart car, a wearable device, a bank-account, among others) or protect the performance of an operation on the Internet-connected asset, the Internet-connected asset comprising (or being linked to) a service backend computer where the Internet-connected asset is assigned to the user through an identifying element of the user; receiving, by the XFA authorization backend, one or more user-configurable security factors, each one of the one or more user-configurable security factors being linked to a producer service and providing information about the user, each producer service being enrolled in the XFA authorization backend, and each one of the one or more user-configurable security factors being received after each producer service having gone through an authentication enrolling process with the XFA authorization backend using a factor enrolling authorization processing unit, and after a consumer service with the service backend computer having gone through a factor subscription process with the user using a factor subscription authorization processing unit; when the user wants to access the Internet-connected asset or the performance of an operation on the Internet-connected asset, the XFA authorization backend receiving a checking enquire for at least one of the one or more user-configurable security factors; and in response to the checking enquire, the XFA authorization backend checking if the user fulfils the enquired user-configurable security factor/s using the identifying element, and authorizing or denying the access or the performance of the operation based on a result of the checking.

Present invention also proposes, according to another aspect, a secure authorization system, comprising an Internet-connected asset of a user for which the user wants to protect access to or the performance of an operation therein; a service backend computer in which the Internet-connected asset is assigned to the user through an identifying element of the user; a factor enrolling authorization processing unit; a factor subscription authorization processing unit; an extra factor authentication, XFA, authorization backend configured to assist the user in the protection of the Internet-connected asset; and a plurality of producer services, each one of the producer services being configured to provide information about the user using a user-configurable security factor.

In the proposed system, the XFA authorization backend is configured to receive one or more user-configurable security factors, the latter being received after each producer service having gone through an authentication enrolling process with the XFA authorization backend using the factor enrolling authorization processing unit, and after a consumer service with the service backend computer having gone through a factor subscription process with the user using the factor subscription authorization processing unit; when the user wants to access the Internet-connected asset or the performance of an operation on the Internet-connected asset, receive a checking enquire for at least one of the one or more user-configurable security factors; and in response to the checking enquire, check if the user fulfils the enquired user-configurable security factor/s using the identifying element, and authorize or deny the access or the performance of the operation based on a result of the checking.

In some embodiments, the identifying element comprises a phone number of the user.

In some embodiments, the user-configurable security factors comprise an integer, a float, a Boolean, a geolocation position, and/or a string.

In some embodiments, the authentication enrolling process comprises using an access token identifying the producer service, the identifying element of the user, and information descriptive of the reason of why the producer service wants to ask the user for permission for enrolling.

In some embodiments, the factor subscription process comprises using the access token identifying the producer service, the identifying element of the user, and information including the user-configurable security factors the producer service is interested to subscribe.

In some embodiments, the authentication enrolling process and/or the factor subscription process comprises using a SMS.

In some embodiments, the authentication enrolling process and/or the factor subscription process comprises using a software application installed in a smart computing device.

In some embodiments, each producer service is enrolled in the XFA authorization backend using a unique ID and a producer service identification description.

Other embodiments of the invention that are disclosed herein also include software programs to perform the method embodiment steps and operations summarized above and disclosed in detail below. More particularly, a computer program product is one embodiment that has a computer-readable medium including computer program instructions encoded thereon that when executed on at least one processor in a computer system causes the processor to perform the operations indicated herein as embodiments of the invention.

Present invention has the following advantages: end-user do not need to interact with service to provide the second factors; multiple factors could be aggregated to increase the security; it is suitable for IoT services.

BRIEF DESCRIPTION OF THE DRAWINGS

The previous and other advantages and features will be more fully understood from the following detailed description of embodiments, with reference to the attached figures, which must be considered in an illustrative and non-limiting manner, in which.

DETAILED DESCRIPTION OF THE INVENTION AND OF PREFERRED EMBODIMENTS

Present invention particularly comprises the following components:

- A headless extra factor authentication (XFA) authorization backend that implements data structures related with services, security factors, users, factor subscriptions and factor enrolling. All these data structures can allow defining who can publish user-related or -configurable security factors and who can consume those security factors to perform XFA authorization.

Factor subscription authorization page/processing unit that allows the users to control which service can access the security factors related with the users.

Factor enrolling authorization page/processing unit that allows the users to control which service can publish the security factors related with the users.

Producer services that act as security factor generators that build information about the users using the user-configurable security factors.

Internet-connected asset(s) that needs XFA, for example, a smart car, a wearable device, a bank-account, etc.

Service backend computer that interacts with the XFA authorization backend using an Authorization API.

Other APIs available to control security factor enrolling and the subscription process as well as security factor value publication.

Figure 1:
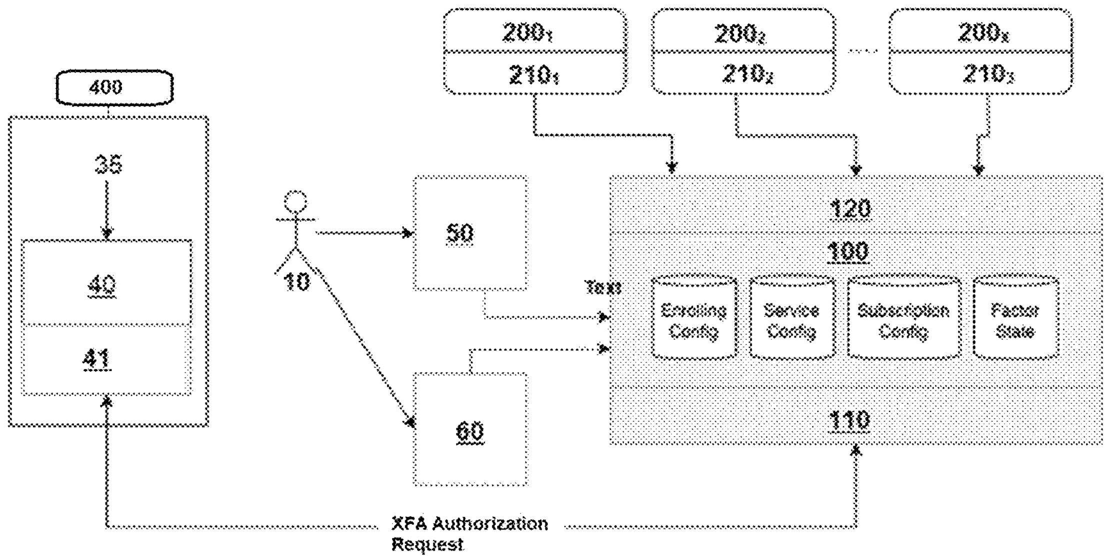
FIG. 1 schematically shows the architecture and components of the proposed invention for enabling secure authentication.

FIG. 1 shows an embodiment of the proposed architecture of the invention. According to this embodiment, a user 10 wants to protect access to the Internet-connected asset 35 or protect the performance of an operation on the Internet-connected asset 35. Consequently, the user 10 registers into the XFA authorization backend 100. A consumer service 400 with the Internet-connected asset 35, for instance, a smart car, has the service backend computer 40 where it is assigned to the user 10 using an identifying element of the user 10, particularly a phone number (MSISDN) of the user.

Each producer service $\mathbf{200}_1$, $\mathbf{200}_2$, . . . , $\mathbf{200}_x$, is enrolled in the XFA authorization backend 100. Following the completion of an authentication enrollment procedure with the XFA authorization backend 100, utilizing the factor enrolling authorization processing unit 60, each producer service $\mathbf{200}_1$, $\mathbf{200}_2$, $\mathbf{200}_x$ provides the user-configurable security factors $\mathbf{210}_1$, $\mathbf{210}_2$ . . . , $\mathbf{210}_x$. Additionally, these security factors $\mathbf{210}_1$, $\mathbf{210}_2$ . . . , $\mathbf{210}_x$ are provided after the service backend computer 40 undergoes a factor subscription process with the user 10. This subscription process is facilitated by the factor subscription authorization processing unit 50.

The XFA authorization backend 100 checks if the user 10 fulfils the user-configurable security factor/s $\mathbf{210}_1$, $\mathbf{210}_2$, . . . , $\mathbf{210}_x$ using the identifying element. Subsequently, the XFA authorization backend 100 either grants or denies access to the Internet-connected asset 35 or the execution of the operation based on the outcome of the verification process.

Figure 2:
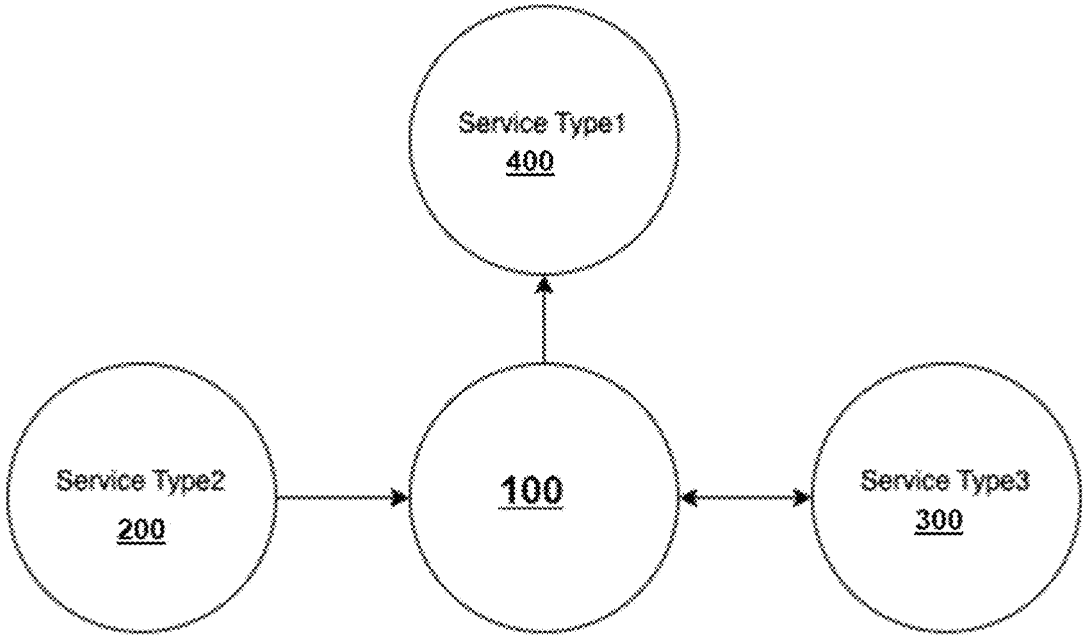
FIG. 2 shows the different types of services that can interact with the XFA authorization backend.

Following the different elements of the system are detailed:

Service Type:

The strength of XFA authorization system in present invention is derived from the interconnectedness of the multiple services. FIG. 2 illustrates the 3 types of services that can interact with XFA authorization backend 100:

Type 1 or consumer services 400: This type of services only consume authorization but do not contribute any security factor 210. Examples of this kind of services could be ecommerce web pages or a smart car service following the previous example. The consumer services 400 interact with the XFA authorization backend 100 through the service backend computer 40.

Type 2 or producer services 200: This kind of services provide security factors 210 about users that could be used for authorization. One example could be a camera that provides user presence at one place as a security factor 210. Each producer service 200 is registered in the XFA authorization backend 100 and a unique id (serviced) is assigned to it.

Type 3 or Consumer & Producer services 300: This type of service is both consumer and producer of security factors 210. One example could be an ecommerce web page that both consumes factors for user authorization and produces a security factor related with arrival of ordered productors at home.

Data Structure

Figure 3:
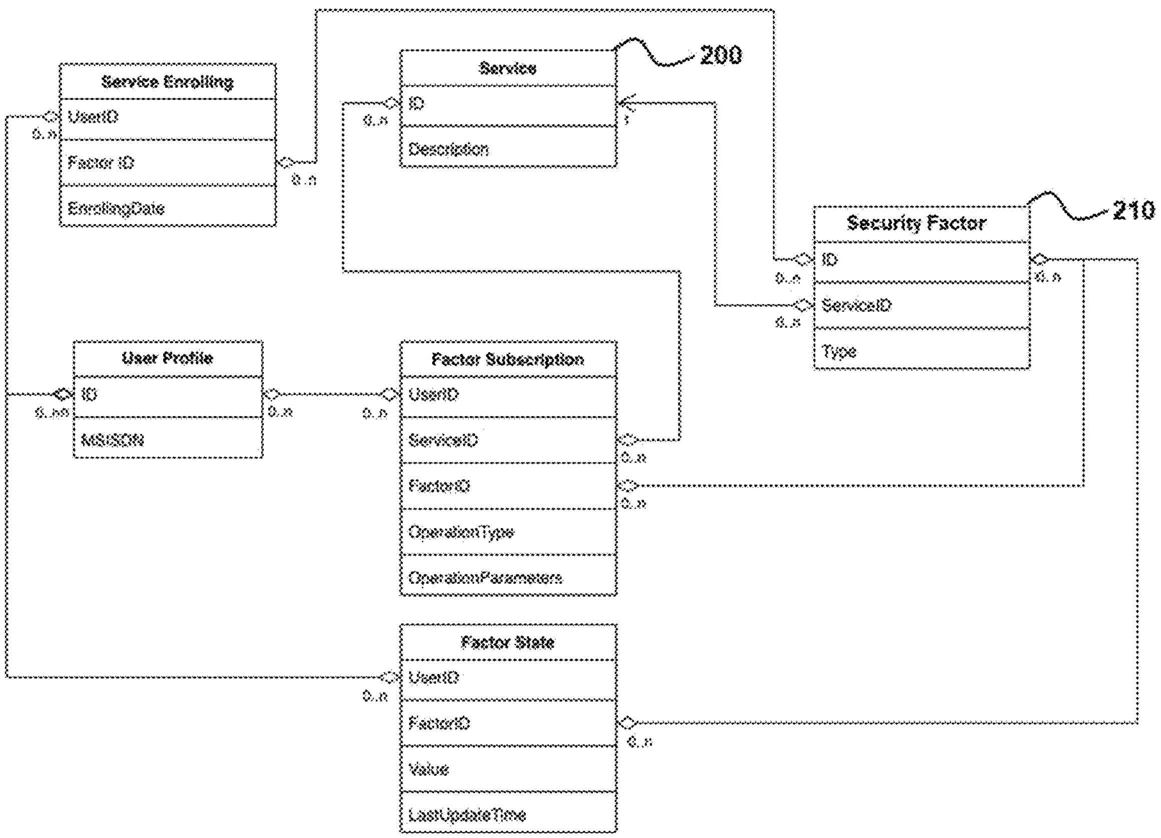
FIG. 3 shows an example of the data structure reflecting the relationship between services, security factors and users.

Different data structures can be defined to reflect the relationship between Producer services 200, security factors 210, and users 10. FIG. 3 illustrates the architecture of these data structures.

User Profile: Each user 10 is represented with a unique profile. Each profile can contain a user id and contact information of the user 10. In some embodiments, the contact channel is the cellular network, and the mobile telephone number (MSISDN) is the contact information.

Service: When a producer service 200 is created, a unique ID is assigned to it. Furthermore, a short description is provided. Preferably, the service short description should be concise and easily identify the producer service 200.

Security Factor: Each producer service 200 can contribute 0 to N security factors 210. Each security factor 210 is uniquely identified by a unique ID and it is associated to a producer service 200 by means of the ServiceID field. Different types are defined for security factors: Integer, Float, Boolean, Geolocation position, String. Other types could be easily included to extent the proposal depending to the service requirements.

Factor State: Each producer service 200 is responsible to keep the security factor state updated in real time as possible. All the security factor states are stored in Factor State structure. It contains a UserID field that references a user and a FactorID that references a given security factor 210. The value of the security factor is stored in the Value field and the LastUpdatedTime contains the timestamp of last update.

Security Factor Subscription: Any consumer service 400 can become consumer of security factors 210 with factor subscription. For instance, as seen in FIG. 1, the consumer service 400 is consuming security factors through the service backend computer 40. The subscription relationship is defined in Factor Subscription table that can comprise the following fields:

UserID that identifies the user 10.

ServiceID that identifies the consumer service 400.

FactorID that identifies the security factor 210 that the consumer service 400 wants to consume.

OperationType identifies the operation that will perform on the security factor value that will determine the authorization.

OperationParameters is the extra parameters that will require for OperationType to compute the authorization. For instance, if operation type is to determine if the user 10 is in a given city, the operation parameters should be the coordinate of the given city.

Service Enrolling: This data structure represents the interest of the user 10 to receive security factors 210 from a given producer service 200. Since each producer service 200 may generate multiple security factors 210, the enrolling is per security factor. It can comprise the following fields:

UserID that identifies the user 10.

FactorID that identifies the security factor 210 that the user 10 is enrolling.

EnrollingDate is the time stamp that indicate the moment that the user 10 has enrolled to a security factor 210.

Service Enrolling for Factor Publication

Any producer service 200 that can identify the user 10 can publish the security factors 210 to the XFA authorization backend 100 using the set of APIs 120. The producer service 200 should be first registered and verified in the XFA authorization backend 100.

The producer service 200 will also perform a login process and get access token to perform API call.

In some embodiments, the enroll API need the following three parameters: Token that is the access token, the identifying element of the user 10, for instance the MSISDN, and the EnrollInfo which contains all the information about the enroll. It contains enough information to descript the reason that the producer service 200 wants to ask the user for permission for enrolling.

Figure 4:
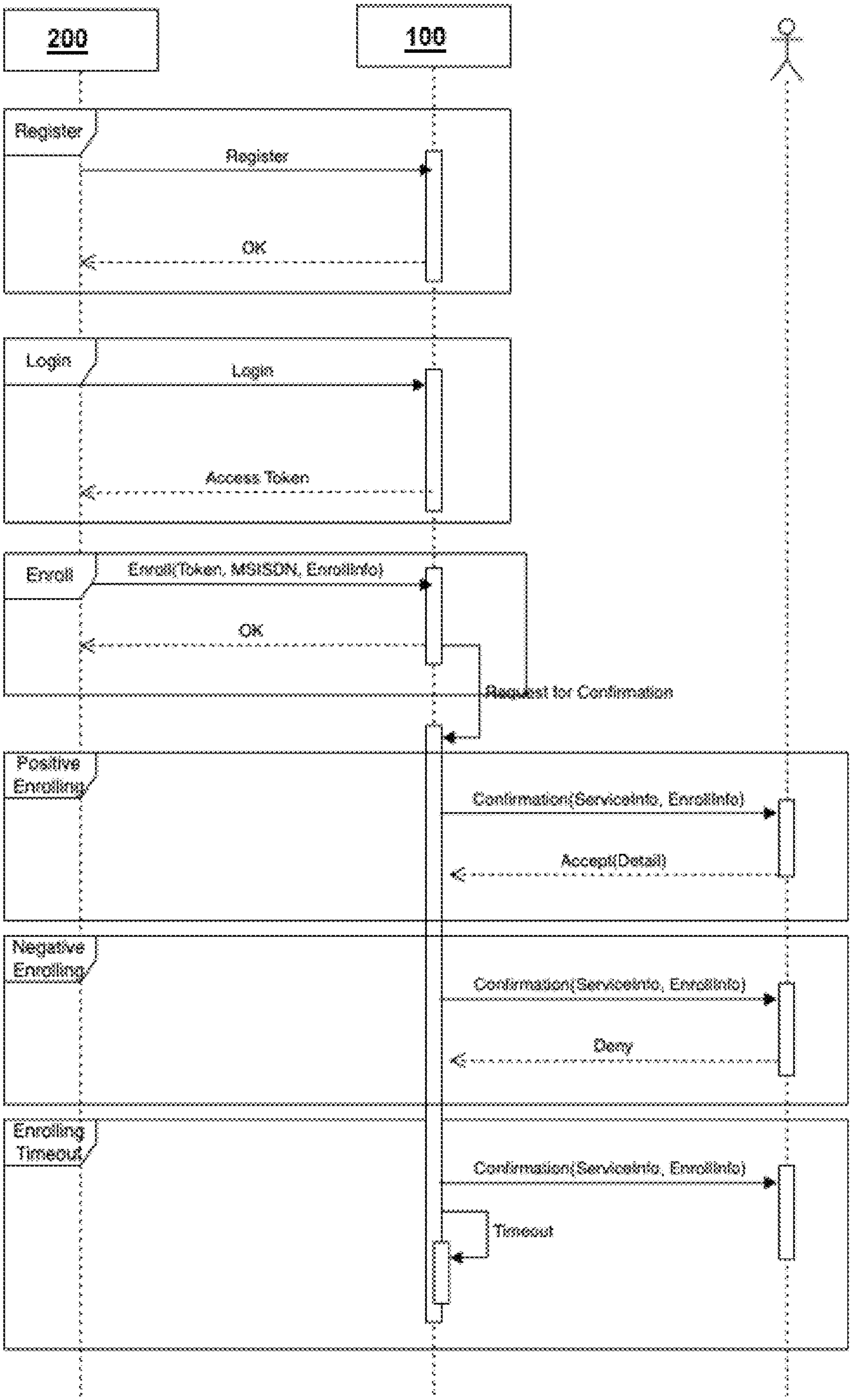
FIG. 4 is a flowchart illustrating the producer services enrolling process.

In some embodiments, the user 10 will get a confirmation request in form of a SMS with a link to a confirmation web page. Three cases could happen. 1) the user 10 can accept the request, but changing some details like the facts that the user 10 is interested to enroll. 2) the user 10 rejects the entire request. 3) the user 10 just doesn't do anything, and the XFA authorization backend 100 will reject the request after a timeout. The above process is illustrated in FIG. 4. After the enrolling process, the XFA authorization backend 100 creates items in Service Enrolling table. Specifically, it creates one row per security factor 210 that the user 10 accepted to enroll.

Factor Publication by Services

Producer service 200 can publish the security factors 210 in the XFA authorization backend 100 by calling Publication API, including four parameters: 1) Access Token, 2) MSISDN, 3) Security factor ID and 4) Security factor related value. The API accepts an array of these parameters, so the producer service 200 can publish a set of security factors 210 in one single call.

Figure 5:
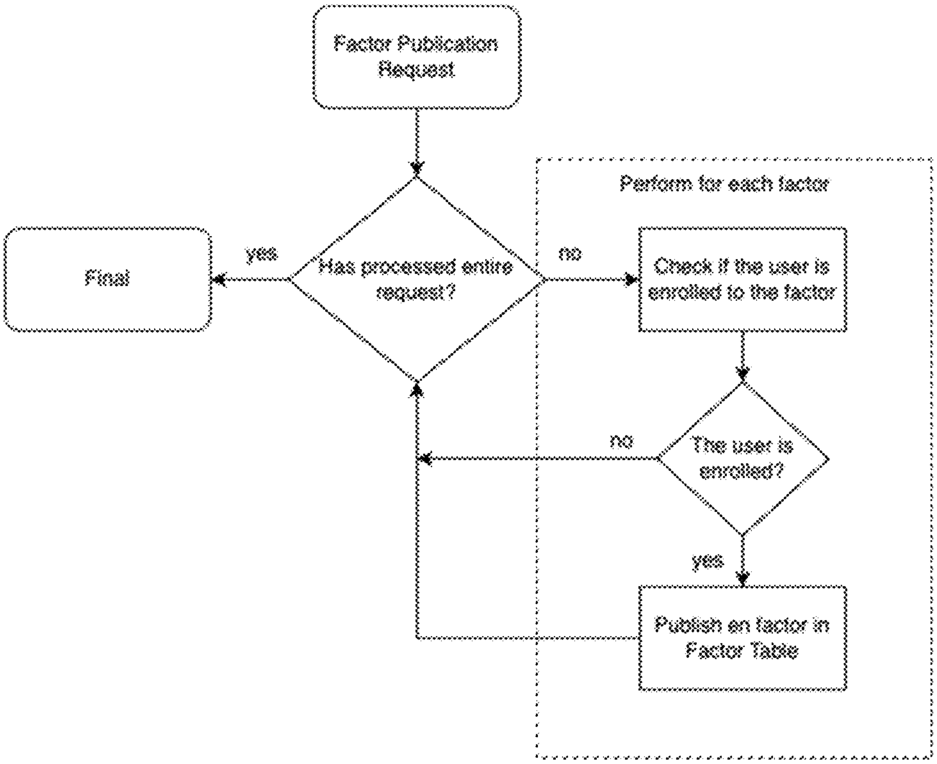
FIG. 5 is a flowchart illustrating the security factor publication logic.

For each security factor 210 in the array, it makes sure that the user 10 is enrolled (specified in Service Enrolling table). If so, it publishes the security factor 210 by injecting a raw in the Factor State Table. Entire process is illustrated in FIG. 5.

Security Factor Subscription for Authorization

Figure 6:
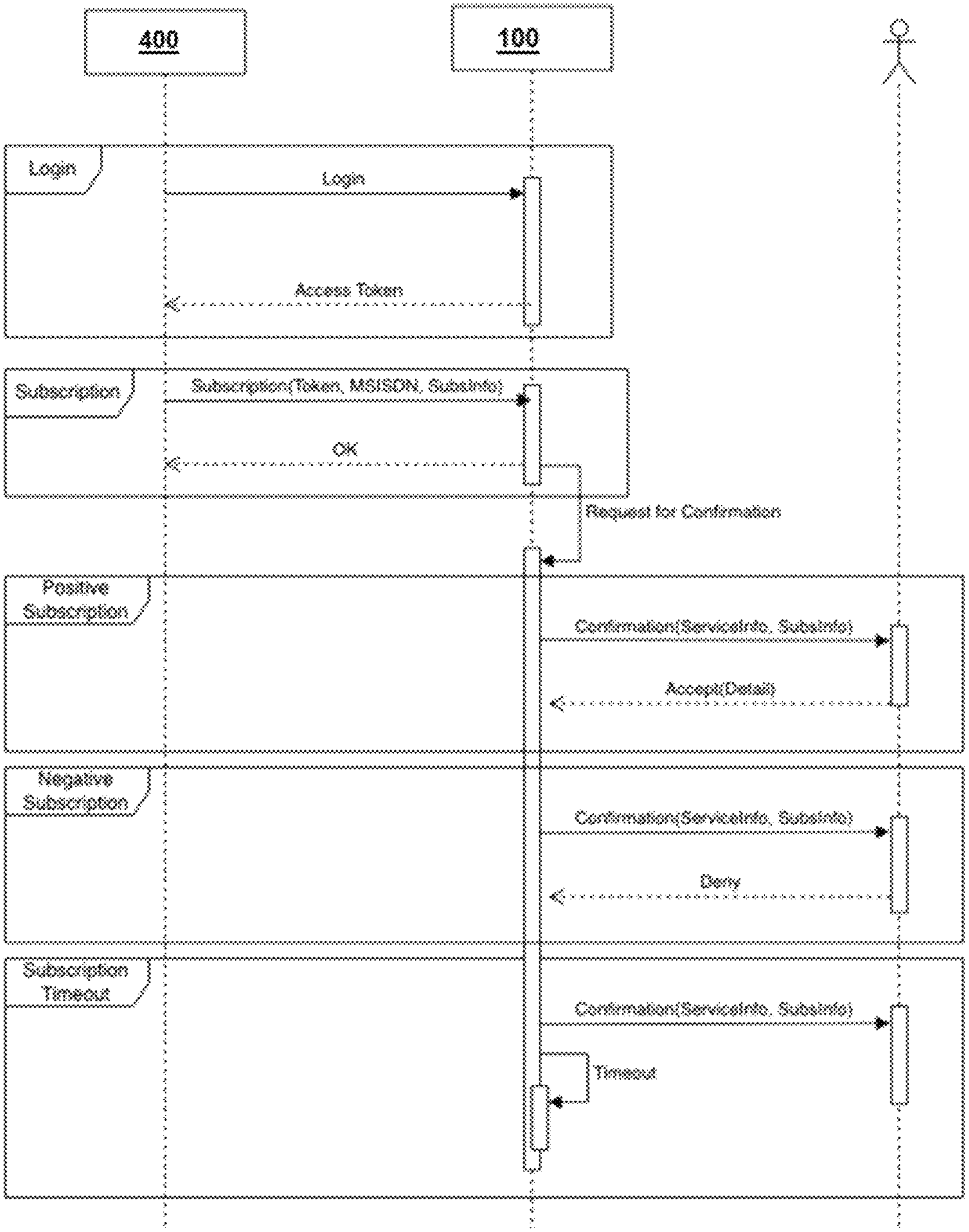
FIG. 6 is a flowchart illustrating the security factor subscription process.

All security factors 210 related with the given user 10 could be consumed by any consumer service 400 to perform authorization. The interested consumer service 400 needs, however, first ask permission from the user 10 to access required security factors 210. The entire process is illustrated in FIG. 6.

First, the consumer service 400 (using the service backend computer 40) performs the login process to get the access token. Second, the consumer service 400 calls Subscription API together with following information: Access Token to identify the consumer service 400; MSISDN to identify the user 10, SubsInfo that descripts the subscription detail. It also includes the list of security factors 210 that the consumer service 400 is interested to subscript, so ask permission to the user 10 to authorize the access.

The XFA authorization backend 100 will request the confirmation of the user 10 to authorize the access to the list of security factors 210 asked by the consumer service 400. For instance, it will send a SMS to the user 10 with a link to the factor subscription authorization processing unit 50. The latter can comprise the description of the consumer service 400, so the user can easily understand from who the request is coming from and the list of security factors 210 that the consumer service 400 is requesting.

The user 10 can accept the request. Furthermore, the user 10 can customize the list of security factors 210 to authorize and others to reject. The user 10 can reject completely the request in the confirmation response. Other possibility is that the user 10 do not do anything. In such a case, the XFA authorization backend 100 will reject the request after a timeout.

Figure 7:
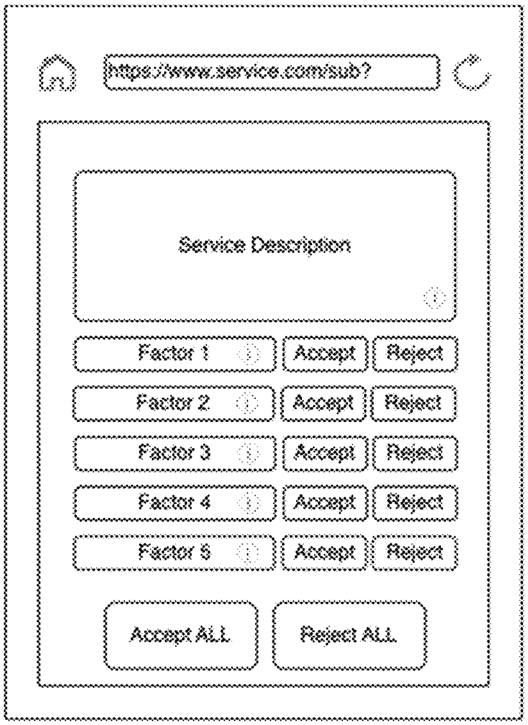
FIG. 7 shows an example of the security factor subscription confirmation page.

FIG. 7 shows a design for the webpage that the user 10 will access to confirm the subscription of security factors 210 that a consumer service 400 is requesting. It contains a service description and a list of security factors 210 that the consumer service 400 is requesting. User 10 can access more information about each security factor 210 be clicking in the information icon. For each security factor 210, user 10 can accept or reject the subscription. Furthermore, the user 10 can accept or reject entire request.

XFA Authorization Request

Once multiple security factors 210 are published, different services 400 can request for XFA authorization based on the value of the list of security factors 210. The entire process is illustrated in the FIG. 8.

In input parameter of the XFA API call, the consumer service 400 can attach the following information:

- Token that is the access token required to call the API 120.
- Identifying number of the user 10.
- XFAOp define the aggregation operation that could be one of the following:
  - AND( ) that all operations on the factor should be positive.
  - OR( ) indicates that only require on positive result among all requested factors.
  - AT LEAST (N) indicates that at least N factors should be confirmed.
- FactorList that indicates the list of the security factors 210 that the consumer service 400 is requesting for XFA authorization. For those security factors 210 that require input parameters, they will be included in the FactorList.

As result of the request, the XFA authorization backend 100 response Authorize of No Authorize, depending on the result of aggregation operation of all results of operations on the list of security factors. Note that there is no interaction with the user 10 for XFA authorization.

Referring back to FIG. 1, as explained before, the Internet-connected asset 35 to be protected can be a smart car. In this case, the invention can aim to implement two security mechanisms—one for unlocking and another for battery charging. Specifically, the smart car 35 can only be unlocked if the user 10 is nearby, and the home-based battery charging station can only be activated without the user's permission if the user 10 is at home.

In the above example, one of the producer services $\mathbf{200}_1$ is a cellular network service and another of the producer services $\mathbf{200}_2$ is a home security service. The cellular network service $\mathbf{200}_1$ can generate a security factor $\mathbf{210}_1$ related to mobile location, specifically by computing the location of the car user's mobile phone and publishing it to the XFA authorization backend 100 in real-time. The home security service $\mathbf{200}_2$ can detect the user 10 when at home. It can be assumed that the producer service $\mathbf{200}_2$ can determine if the user 10 is at home and publish this information to the XFA authorization backend 100 in real-time. Particularly, in FIG. 1, there is only one consumer service 400 with the service backend computer 40 (not limiting as in other embodiments several consumer services 400 can be included). Whenever the smart car 35 is unlocked or being charged, it communicates with the XFA authorization backend 100 (via SDK

41) to request authorization. As explained before, the consumer service 400 can consume the security factors 210.

In terms of data structure, the XFA authorization backend 100 initially contains descriptions of the two producer services $\mathbf{200}_1$, $\mathbf{200}_2$ and of the consumer service 400. Specifically, the Service data structure comprises three entries: one for the cellular network service (ID=S1), one for the home security service (ID=S2), and another for the consumer service (e.g. the smart car service) (ID=S3).

Table 1 below shows the content of the service data structure.

Since each producer service $\mathbf{200}_1$, $\mathbf{200}_2$ generates only one security factor $\mathbf{210}_1$, $\mathbf{210}_2$, respectively, the factor data structure has two entries: one associated with mobile location and another with user presence at home. It's important to note that the consumer service 400 with ID S3 and service backend computer 40 is not associated with any security factor because it is a consumer service. Table 2 shows the content of the factor data structure.

The mobile location factor is identified by ID F1 and is generated by the service with ID S1, which is the cellular network service $\mathbf{200}_1$. The user presence at home is identified by ID F2 and is generated by the service S2. It's worth noting that the type of factor F1 is geolocation (phone geolocation position), while F2 contains Boolean data (whether or not the owner is at home).

TABLE 1

Service data structure content

| ID | Description |
|---|---|
| S1 | Your cellular network service |
| S2 | Your home security service |
| S3 | Your smart car service |

TABLE 2

Factor data structure content

| ID | ServiceID | Type |
|---|---|---|
| F1 | S1 | Geolocation position |
| F2 | S2 | Boolean |

Furthermore, it is assumed that the user 10 is correctly registered in the XFA authorization backend 100, and a profile is created in the User Profile data structure. For instance, it is assumed that the User ID is U1, the MSISDN is M1.

With regard to the enrolling process, given the initial data structure, the user 10 needs to enroll in the two producer services $\mathbf{200}_1$, $\mathbf{200}_2$ to enable them to publish security factors $\mathbf{210}_1$, $\mathbf{210}_2$ to the XFA authorization backend 100. The enrollment process is carried out separately by each producer service $\mathbf{200}_1$, $\mathbf{200}_2$ and is defined in FIG. 4.

First, the Cellular Network Service $\mathbf{200}_1$ must undergo the authentication process with the XFA authorization backend 100 and make a call to the Enroll API. The XFA authorization backend 100 will then request the user's approval. Specifically, the user 10 will need to access the Factor Enrolling Authorization Page 60 and grant permission to the Cellular Network Service $\mathbf{200}_1$ to publish Mobile Location data to the XFA authorization backend 100. Similarly, the Home Security Service $\mathbf{200}_2$ will need to follow the same procedure to be able to publish information about user's presence to the XFA authorization backend 100.

At the end of these two enrollment processes, the XFA authorization backend 100 will contain two entries in the Service Enrolling data structure:

TABLE 3

Service enrolling data structure content, after the user U1 enrolls to the 2 services

| UserID | FactorID | EnrollingDate |
|---|---|---|
| U1 | F1 | 18 Sep. 2023 |
| U1 | F2 | 18 Sep. 2023 |

Once enrolling process succeed, the two producer services $\mathbf{200}_1$, $\mathbf{200}_2$ are entitled to publish two security factors $\mathbf{210}_1$, $\mathbf{210}_2$ into the XFA authorization backend 100 using Factor Publication API, defined in FIG. 5. Factor publication result to new entries in the Factor State data structure. For instance, Table 4 shows the value of 2 factors. In this case, it says that the user 10 (UserID=U1) is in geolocation corresponds to latitude-34.232 and longitude 150.220 (published at 18/09/2023 23:10:20). It also says that the user 10 is not at home because U1/F2 row contains value false.

TABLE 4

Factor state data structure content, once the two services publish the security factors to the backend

| UserID | FactorID | Value | LastUpdateTime |
|---|---|---|---|
| U1 | F1 | {lat: −34.232, lng: 150.220} | 18 Sep. 2023 23:10:20 |
| U1 | F2 | False | 18 Sep. 2023 20:09:10 |

Consumer service 400 with service backend computer 40, on other hand, do need to perform Factor Subscription process (FIG. 6) to request the user 10 to authorize the use of the geolocation and person presence factors to implement XFA. The task is completed by calling API the Subscription (Token, MSISDN, SubsInfo). Specifically, MSISDN is phone number of the user 10, M1, and SubInfo contains the list of security factors that the service wants to subscription (F1 and F2).

With regard to the subscription process, the XFA authorization backend 100 sends a link to the factor subscription authorization page 50 (FIG. 7) to request the authorization. The user 10 accepts the subscription request by clicking in Accept ALL (FIG. 7). At end of the process, two new entries are created in the Factor Subscription data structure (Table 5). The first entry is related with user 10 geolocation. The operation is GDistanceLT which receives three input parameters: 1) the value from Factor State data structure (G1), 2) the value from OperationParameter (P) and 3) the value from XFA authorization request (G2). Given these three parameters, the GDistanceLT returns true if distance between G1 and G2 is less than P. In this case, P is 100 meters. Basically, XFA authorization backend 100 returns true if the distance between user 10 and the car is less than 100 meters.

The second entry is related with whether the user 10 is at home. The operation is Eq which return true is the value in Factor State is equal to value in OperationParameters. In this case, it only returns true if the user 10 is at home.

TABLE 5

| Factor Subscription data structure content | | | | |
|---|---|---|---|---|
| UserID | ServiceID | FactorID | OperationType | OperationParameters |
| U1 | S3 | F1 | Geolocation Distance less than (GDistanceLT) | 100 m |
| U1 | S3 | F2 | Equal to (Eq) | True |

Figure 8:
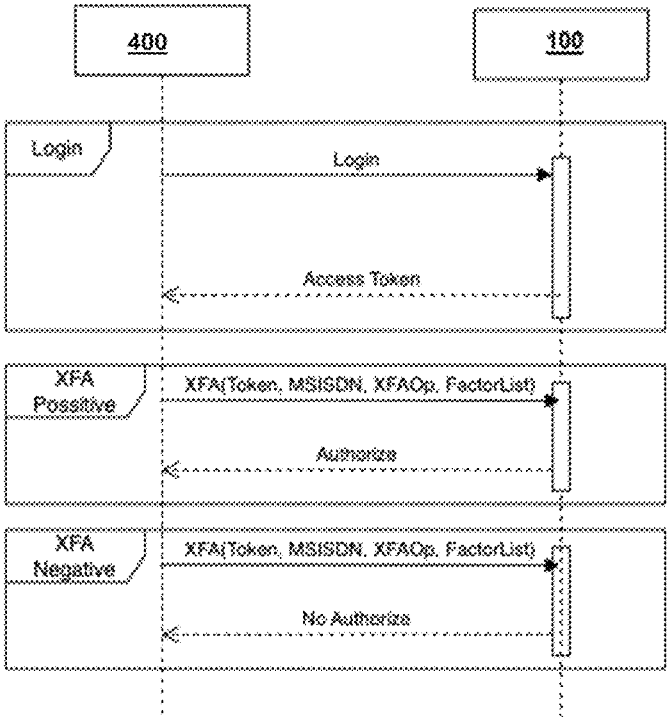
FIG. 8 is a flowchart illustrating the XFA authorization request process.

Once everything is correctly performed, the service backend computer 40 can contact XFA authorization backend 100 for XFA. The first operation is when the user 10 wants to open the smart car 35. For instance, this can be carried in the following manner:

- The user 10 inserts the key to open the door.
- The car onboard computer validates the key to make sure that key is correct.
- Assuming that it is the correct key, the car 35 contacts with the service backend computer 40 to request for further validation.
- The service backend computer 40 contacts the XFA authorization backend 100 to make sure that user 10 is close-by. Specifically, it performs the XFA authorization process (FIG. 8). It calls API XFA (Token, MSISDN, XFAOp, FactorList), where:
  - MSISDN is the user's phone number, M1.
  - XFAOp is AND. In fact, this is irrelevant because FactorList only has one security factor.
  - FactorList is something like [{Factor: F1, Params: {lat: −34.232, Ing: 150.221}}. Assuming that the car 35 is in Latitud −34.232 and Longitud 150.221.
- The XFA authorization backend 100 computes the distance between the car 35 and the user 10. If it is less than 100 m, it returns true.
- The service backend computer 40 returns the result of XFA back to the car 35.
- The car 35 opens the door.

When the key is stolen by another user, the car 35 can detect that user 10 is not close-by and refuses to open the door, although the key is perfectly valid.

For the battery charging control, in this case, the car 35 needs to make sure that user 10 is at home to start charging the battery. The service backend computer 40 contact with XFA authorization backend 100 to check the factor F2, which indicates if the user 10 is at home.

Instead of using SMS to communicate with users for factor subscription or service enrolling approval, an independent application could be installed in the user's mobile computing device. In such a case, the XFA authorization backend 100 system provides a binding API that allows customer services to associate the user identity in the XFA backend 100 with user identity in the customer service. Other advantage of such an implementation is the fact that MSISDN could maintain anonymous.

Furthermore, although three XFAOps (AND, OR, ATLEAST) have been defined to facilitate different interactions within the XFA authorization process, the invention can also accommodate the definition of additional operations to enable further flexibility and functionality in the XFA authorization process.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in software elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real-time network operating systems.

The scope of the present invention is defined in the following set of claims.

The invention claimed is:

1. A secure authorization method, comprising:

providing, an extra factor authentication, XFA, authorization backend, the XFA authorization backend having registered therein a user that wants to protect access to an Internet-connected asset or protect the performance of an operation on the Internet-connected asset, the Internet-connected asset comprising a service backend computer where the Internet-connected asset is assigned to the user through an identifying element of the user;

receiving, by the XFA authorization backend, one or more user-configurable security factors, each one of the one or more user-configurable security factors being linked to a producer service and providing information about the user, each producer service being enrolled in the XFA authorization backend, and each one of the one or more user-configurable security factors being received after each producer service having gone through an authentication enrolling process with the XFA authorization backend using a factor enrolling authorization processing unit, and after a consumer service with the service backend computer having gone through a factor subscription process with the user using a factor subscription authorization processing unit;

when the user wants to access the Internet-connected asset or the performance of an operation on the Internet-connected asset, the XFA authorization backend receiving a checking enquire from at least one consumer service for at least one of the one or more user-configurable security factors; and in response to the checking enquire, the XFA authorization backend checking if the user fulfils the enquired user-configurable security factors using the identifying element by performing an aggregation operation, defined by the at least one consumer service, and authorizing or denying the access or the performance of the operation based on a result of the aggregation operation, wherein the XFA authorization backend checking is performed without further user interaction.

2. The method of claim 1, wherein the identifying element comprises a phone number of the user.

3. The method claim 1, wherein the one or more user-configurable security factors comprise an integer, a float, a Boolean, a geolocation position, and/or a string.

4. The method claim 1, wherein the authentication enrolling process comprises using an access token identifying the producer service, the identifying element of the user, and information descriptive of the reason of why the producer service wants to ask the user for permission for enrolling.

5. The method of claim 4, wherein the factor subscription process comprises using the access token identifying the producer service, the identifying element of the user, and information including the one or more user-configurable security factors the producer service is interested to subscribe.

6. The method of claim 1, wherein the authentication enrolling process and/or the factor subscription process comprises using a SMS.

7. The method of claim 1, wherein the authentication enrolling process and/or the factor subscription process comprises using a software application installed in a smart computing device.

8. The method of claim 1, wherein each producer being enrolled in the XFA authorization backend by means of a unique ID and a service identification description.

9. The method of claim 1, wherein the Internet-connected asset comprises a smart car, a wearable device, or a bank-account.

10. A secure authorization system, comprising:

an Internet-connected asset of a user for which the user wants to protect access to or the performance of an operation therein;

a service backend computer in which the Internet-connected asset is assigned to the user through an identifying element of the user;

a factor enrolling authorization processing unit;

a factor subscription authorization processing unit;

an extra factor authentication, XFA, authorization backend configured to assist the user in the protection of the Internet-connected asset;

a plurality of producer services, each one of the producer services being configured to provide information about the user using a user-configurable security factor;

wherein the XFA authorization backend is configured to:

receive one or more user-configurable security factors, the latter being received after each producer service having gone through an authentication enrolling process with the XFA authorization backend using the factor enrolling authorization processing unit, and after a consumer service with the service backend computer having gone through a factor subscription process with the user using the factor subscription authorization processing unit;

when the user wants to access the Internet-connected asset or the performance of an operation on the Internet-connected asset, receive a checking enquire from at least one consumer service for at least one of the one or more user-configurable security factors; and in response to the checking enquire, check if the user fulfils the enquired user-configurable security factors using the identifying element by performing an aggregation operation, defined by the at least one consumer service, using the enquired user-configurable security factors, and authorize or deny the access or the performance of the operation based on a result of the aggregation operation, wherein the XFA authorization backend checking is performed without further user interaction.

11. The system of claim 10, wherein the identifying element comprises a phone number of the user.

12. The system of claim 10, wherein the one or more user-configurable security factors comprise an integer, a float, a Boolean, a geolocation position, and/or a string.

13. The system of claim 10, further comprising a software application installed in a smart computing device, the authentication enrolling process and/or the factor subscription process being made using the software application.

14. The system of claim 10, wherein the Internet-connected asset comprises a smart car, a wearable device, or a bank-account.

* * * * *